(12) United States Patent
Ruder et al.

(10) Patent No.: US 10,707,946 B2
(45) Date of Patent: Jul. 7, 2020

(54) METHOD AND APPARATUS FOR COHERENT RECEIVE BEAMFORMING

(71) Applicant: Intel IP Corporation, Santa Clara, CA (US)

(72) Inventors: Michael Ruder, Pommelsbrunn (DE); Yeong-Sun Hwang, Oberhaching (DE); Zhibin Yu, Unterhaching (DE); Holger Neuhaus, Munich (DE); Tom Harel, Shefayim (IL); Rajarajan Balraj, Nuremburg (DE); Matthias Malkowski, Berg (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/402,273

(22) Filed: May 3, 2019

(65) Prior Publication Data
US 2020/0007222 A1    Jan. 2, 2020

(30) Foreign Application Priority Data

Jun. 29, 2018  (EP) ..................................... 18181006

(51) Int. Cl.
| | |
|---|---|
| *H04B 7/08* | (2006.01) |
| *H04B 7/0456* | (2017.01) |
| *H04L 25/02* | (2006.01) |
| *H04L 27/26* | (2006.01) |
| *H04B 17/318* | (2015.01) |

(52) U.S. Cl.
CPC ........... *H04B 7/086* (2013.01); *H04B 7/0456* (2013.01); *H04B 7/0857* (2013.01);
(Continued)

(58) Field of Classification Search
CPC .. H04B 7/0413; H04B 7/0628; H04B 7/0632; H04B 7/0842; H04B 7/086;
(Continued)

(56) References Cited

U.S. PATENT DOCUMENTS

| | | | | |
|---|---|---|---|---|
| 7,844,219 B2* | 11/2010 | Park | ...................... | H04B 7/155 455/11.1 |
| 2006/0072683 A1* | 4/2006 | Kent | .................... | H04B 7/0697 375/267 |

(Continued)

FOREIGN PATENT DOCUMENTS

| | | |
|---|---|---|
| CN | 107733513 A | 2/2018 |
| EP | 2454825 A1 | 5/2012 |

(Continued)

OTHER PUBLICATIONS

Qualcomm Incorporated: "Synchronization signal bandwidth and sequence design", 3GPP Draft; R1-1706147 Synchronization Signal Bandwidth and Sequence Design, 3rd Generation Partnership Project (3GPP), Mobile Competence Centre ; 650, Route Des Lucioles ; F-06921 Sophia-Antipolis CE.

*Primary Examiner* — Khanh C Tran
(74) *Attorney, Agent, or Firm* — 2SPL Patent Attorneys (57) ABSTRACT

A method and apparatus for receive beam-forming in an analog domain. A user equipment may perform channel estimation for obtaining a set of channel responses for a plurality of antennas of the UE. The UE may determine a beamforming codeword for receive beamforming based on the set of channel responses. The UE may apply a training codeword to the received signal in analog domain. The training codeword includes phase adjustment coefficients for each antenna and a different training codeword may be applied for each channel observation. The UE may measure a metric for at least one candidate codeword based on the set of channel responses and determine the beamforming codeword based on the metric.

20 Claims, 7 Drawing Sheets

(52) U.S. Cl.
CPC ....... *H04B 7/0882* (2013.01); *H04L 25/0204* (2013.01); *H04L 25/0224* (2013.01); *H04L 27/2695* (2013.01); *H04B 17/318* (2015.01)

(58) Field of Classification Search
CPC ...... H04B 7/0456; H04B 7/0857; H04B 1/06; H04B 7/0408; H04B 7/0626; H04B 7/0684; H04B 7/088; H04B 7/0882; H04L 25/0244; H04L 25/03019; H04L 25/0202; H04L 27/2647; H04L 25/0204; H04L 25/0224; H04L 27/2695
See application file for complete search history.

(56) References Cited

U.S. PATENT DOCUMENTS

| | | | |
|---|---|---|---|
| 2006/0072690 A1* | 4/2006 | Kent | H04L 25/0204 375/347 |
| 2011/0103350 A1* | 5/2011 | Lindoff | H04W 36/0094 370/332 |
| 2011/0109507 A1* | 5/2011 | Warnick | H01Q 21/0025 342/368 |
| 2014/0269871 A1* | 9/2014 | Huynh | H04B 1/38 375/224 |
| 2018/0160363 A1* | 6/2018 | Xu | H04W 48/16 |
| 2019/0058262 A1* | 2/2019 | Maruyama | H01Q 3/24 |

FOREIGN PATENT DOCUMENTS

| | | |
|---|---|---|
| EP | 2965452 A1 | 1/2016 |
| WO | 2011022404 A2 | 2/2011 |
| WO | 2017039739 A1 | 3/2017 |

\* cited by examiner

METHOD AND APPARATUS FOR COHERENT RECEIVE BEAMFORMING

FIELD

Examples relate to receive beamforming in a wireless communication system, more particularly to a method and apparatus for coherent receive beamforming in a user equipment (UE).

BACKGROUND

The Third Generation Partnership Project (3GPP) New Radio (NR) system (Fifth Generation (5G)) employs mmWave transmissions. The carrier frequency will be in the range of 24 GHz to 100 GHz. At such high frequencies beam forming is applied at a base station (called "gNB") and a user equipment (UE) to compensate for the high path loss. At the UE, receiver (RX) beam forming may be implemented via analog beam forming. Digital beam forming may not be feasible at the UE for the high number of receive antennas because they share a single analog-to-digital converter (ADC). A typical RX beamforming implementation may be done via phase shifters per receive antenna element and summation of the analog phase shifted signals. The combined signal is converted to digital by an ADC via sampling.

Given a non-varying transmit side beamforming at the gNB, the UE needs to optimize the analog beamforming phase shifts and switches to use an antenna element or not to maximize the overall path gain. The 3GPP NR supports two reference signals for the RX beam management at the UE: a synchronization signal block (SSB) and a channel state information reference signal (CSI-RS).

Previous proposed solutions rely on a pre-optimized codebook for the phase shift values. The codebook is optimized in such a way to cover all possible directions of one antenna panel. A UE iteratively applies RX beam switching for pre-optimized codeword candidates and then measures the corresponding RX beam, until a best pre-optimized codeword is found. The codebook may consist of a small number of coarse beams and many sharp beams. The RX beam may be optimized by first searching for the best coarse beam and then searching for the best sharp beam within the sharp beams that are contained in the coarse beam. An alternative is to do a full search over all possible sharp beams.

Even though potentially optimized for a given hardware configuration and scenario, a codebook may not be optimal due to dynamically changing environmental influences and production tolerances for the antennas in the final form factor. Therefore, the correspondence between the coarse beams and the sharp beams cannot be always ensured. In addition, the optimum receive beam may no longer be a part of the pre-configured codebook at all. To guarantee a near-optimum beam in the pre-configured codebook, a sufficiently fine granularity of beam directions needs to be supported and hence the number of codebook entries that need to be tested may become substantial. This may result in an unacceptably long time to acquire a near-optimum beam.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Examples are disclosed for methods and apparatus to derive the optimal codeword (i.e. phase adjusting coefficients/beamforming coefficients) based on the measured channel response on each individual antenna/antenna element, without needing a pre-defined codebook.

Examples are also disclosed for methods and apparatus to make use of pre-defined or pre-optimized codewords as training codewords, so that a conventional codebook-based RX beamforming method and a coherent RX beamforming method in accordance with the examples disclosed herein may be applied in parallel and/or combined to further shorten the time for searching for the optimum codeword for receive beamforming.

Examples are also disclosed for methods and apparatus for exploring current 3GPP NR reference signal framework (e.g. CSI-RS only, SSB only, or CSI-RS and SSB combined scheme based on quasi-co-location (QCL) information). Examples are disclosed for methods to better make use of the NR SSB properties to improve the coherent RX beamforming performance. For example, a primary synchronization signal (PSS) symbol may be dynamically taken into account as a coherent measurement training symbol based on colliding PSS detection using the secondary synchronization signal (SSS) and/or demodulation reference signal (DMRS) in the same SSB, so that the training time can be shortened. In another example, the physical broadcast channel (PBCH) data sub-carriers may be used (based on priori master information block (MIB) information or run-time PBCH decoding) in coherent RX beam channel observation, so that more resource elements (REs) can be exploited to improve the coherent measurement accuracy.

In the examples, a UE may estimate the channel response on each individual antenna/antenna element during a training stage. It is assumed that the UE includes $N_R$ antennas/antenna elements within an antenna array. The UE may apply $N_R$ times (or more or less depending on UE capability) of RX beam switching during training to obtain a vector of $N_R$ combined channel observations in the digital domain, while each RX beam is associated with a training codeword. The channel response for each antenna/antenna element may be estimated by multiplying an inversed training codeword matrix with the combined channel observation vector.

Based on the estimated channel response on each antenna/antenna element, the UE may perform codeword search in a digital domain. The example methods disclosed herein transform the analog RX beamforming problem into a digital RX beamforming problem, so that the time to find the best codeword for RX beamforming may be determined by digital processing latency, not by radio frequency (RF) switching latency or the network scheduling of the reference signals. The examples allow to fully exploit any configurability on the RF side to its full potential without being limited by a codebook, thus e.g. allowing higher peak throughput by means of antenna fine-tuning.

Figure 1:
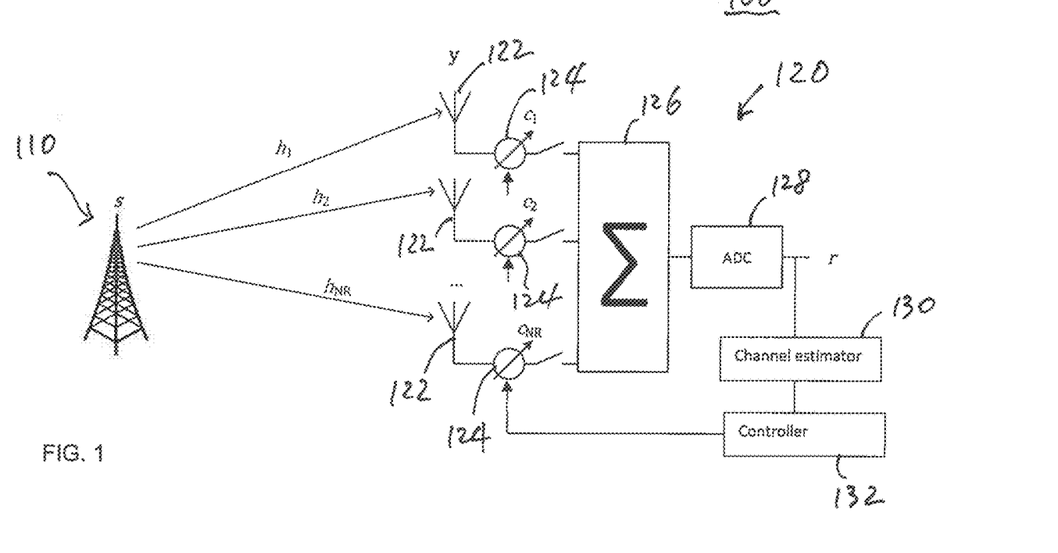
FIG. 1 shows an example wireless communication network.

FIG. 1 shows an example wireless communication network in which a UE may implement a coherent receive beamforming in accordance with examples disclosed herein. The network 100 may include at least one base station (e.g. gNB, eNB, etc.) 110 and at least one UE 120. The UE 120 includes a plurality of antennas/antenna elements 122 (hereinafter collectively "antennas"), a plurality of phase shifters 124, a combiner 126, an ADC 128, a channel estimator 130, and a controller 132.

The UE 120 may implement analog beamforming, i.e. the receive beamforming may be implemented in an analog domain. The UE 120 receives signals from the base station 110 via the antennas 122. The RX beamforming may be implemented via the phase shifters 124. The phase of the received signals is adjusted by applying the phase adjusting coefficients, $c_1, c_2, \ldots, c_{N_R}$, (referred to as a "codeword") to the received signals. The phase adjusted signals are then combined by the combiner 126. The combined signal is then converted to digital by the ADC 128. The channel estimator 130 estimates a channel response (e.g. in a frequency domain) for the plurality of antennas 122 based on the digital version of the combined signal. The channel is observed multiple times (e.g. $N_R$ times) with a plurality of training codewords (i.e. the channel is observed each time with a different training codeword) and a set of channel responses for the plurality of antennas 122 is computed from the channel observations.

The controller 132 performs numerous functions for the RX beamforming at the UE 120. The controller 132 may set a training codeword to be applied to the received signal by the phase shifters 124 in analog domain. The training codeword includes phase adjustment coefficients for each antenna 122 and a different training codeword is applied for each channel observation during training. The controller 132 determines the phase adjusting coefficients (i.e. a RX beamforming codeword) for RX beamforming based on the estimated channel responses. The controller 132 may measure a metric for at least one candidate codeword based on the set of channel responses and determine the beamforming codeword based on the metric or may compute the beamforming codeword from the set of channel responses by reverting a channel distortion for each antenna, which will be explained in detail below. After the training, the selected beamforming codeword is applied to a received signal on the plurality of antennas for receive beamforming. In accordance with the examples disclosed herein, the UE 120 may optimize the analog phase shift values and switches via observations of the digital sum signal of all receive antennas. The UE 120 may exploit the structure of the reference signals available for channel measurements (e.g. the SSB in the NR).

Hereinafter, examples will be explained with reference to UE receive beamforming optimization for one polarization and one radio head. It should be noted that the examples disclosed herein are applicable individually per polarization and/or radio head. It should also be noted that the examples will be explained with reference to the 3GPP NR, but the examples are applicable to any wireless communication systems including, but not limited to, Fourth Generation (4G), Fifth Generation (5G), wireless local area network (WLAN), etc.

The received signal after sampling by the ADC 128 at a resource element (RE) k in the orthogonal frequency division multiplexing (OFDM) symbol l may be written as:

$$r(k,l) = [c_1(l) \cdots c_{N_R}(l)] \begin{bmatrix} h_1(k) \\ \vdots \\ h_{N_R}(k) \end{bmatrix} s(k,l) + w(k,l), \quad \text{Equation (1)}$$

where $s(k,l) \in \mathbb{C}$ is a reference signal transmitted on RE k, $h_n(k) \in \mathbb{C}0$ is a channel response at a receive antenna $n \in \{1, \ldots, N_R\}$, $c_n(l) \in \mathbb{C}$ is a phase combination factor (i.e. phase adjusting coefficients) for receive antenna $n \in \{1, \ldots, N_R\}$ (e.g. a training codeword), which is applied over the whole frequency range, and w(k,l)∈ℂ is an additive white Gaussian noise. Here, ℂ denotes the set of complex numbers. In the following, without loss of generality, it is assumed that $|c_n(l)|^2=1$, i.e. the elements of the codeword may include phase shifts only. The channel in Equation (1) is assumed to be constant for multiple channel measurements (e.g. $N_R$ times of measurements).

The channel may be observed multiple times (e.g. $N_R$ times) with different training codewords $c_n(l)$, $n \in \{1, \ldots, N_R\}$ that vary over time l (e.g. $l=1 \ldots N_R$). The optimum codeword for RX beamforming is determined via training. Training codewords are the codewords applied for RX beamforming during the channel measurements/observations. The system model for the received signals after observing $l=1 \ldots N_R$ OFDM symbols may then be written as:

$$\begin{bmatrix} r(k,1) \\ \vdots \\ r(k,N_R) \end{bmatrix} = \begin{bmatrix} s(k,1) & 0 & 0 \\ 0 & \ddots & 0 \\ 0 & 0 & s(k,N_R) \end{bmatrix} \cdot \begin{bmatrix} c_1(1) & \cdots & c_{N_R}(1) \\ \vdots & \ddots & \vdots \\ c_1(N_R) & \cdots & c_{N_R}(N_R) \end{bmatrix} \cdot \begin{bmatrix} h_1(k) \\ \vdots \\ h_{N_R}(k) \end{bmatrix} + \begin{bmatrix} w(k,1) \\ \vdots \\ w(k,N_R) \end{bmatrix}. \quad \text{Equation (2)}$$

Equation (2) may be rewritten with matrix/vector notation as follows:

$$r(k) = S(k) \cdot C \cdot h(k) + w(k). \quad \text{Equation (3)}$$

Assuming that the training codeword matrix C is invertible, the estimate of the channel ĥ can be computed as follows:

$$\begin{aligned} \hat{h}(k) &= C^{-1} \cdot S^{-1}(k) \cdot r(k) \\ &= h(k) + C^{-1} \cdot S^{-1}(k) \cdot w(k), \\ &= h(k) + \tilde{w}(k), \end{aligned} \quad \text{Equation (4)}$$

where $\hat{h}(k) = [\hat{h}_1(k) \ldots \hat{h}_{N_R}(k)]^T$ contains the channel estimates $\hat{h}_n(k)$ of the channel before analog beamforming for each antenna. The estimate in Equation (4) includes the channel response and an additive noise $\tilde{w}(k)$, which is a white Gaussian noise. The channel estimates in Equation (4) may be available for all resource elements k bearing reference symbols or any known symbols. Therefore, the estimation noise may be reduced by employing frequency direction filtering (e.g. averaging over multiple reference/known symbols) per receive antenna. The signal after the frequency direction filtering is denoted by $\check{h}(k) = [\check{h}_1(k) \ldots \check{h}_{N_R}(k)]^T$.

With the knowledge of the channel before analog beamforming, the optimum codeword for receive beamforming may then be searched. In order to select the optimum codeword for receive beamforming, a predetermined metric may be computed, such as a reference signal received power (RSRP), a received signal strength indicator (RSSI), a signal-to-noise ratio (SNR), a mutual information (MI), or the like. In examples, a codeword that provides the best metric may be selected for receive beamforming.

Using the channel estimates after filtering $\check{h}(k)$ and the channel estimates including noise $\hat{h}(k)$, an RSRP of the combined signal may be estimated as follows:

$$RSRP = \frac{1}{|\mathcal{K}|} \sum_{k \in \mathcal{K}} \left| [\tilde{c}_1 \cdots \tilde{c}_{N_R}] \begin{bmatrix} \check{h}_1(k) \\ \vdots \\ \check{h}_{N_R}(k) \end{bmatrix} \right|^2, \quad \text{Equation (5)}$$

where $[\tilde{c}_1 \ldots \tilde{c}_{N_R}]$ is a candidate codeword for RX beamforming, $\mathcal{K}$ denotes the set of resource elements bearing reference symbols, and $|\mathcal{K}|$ denotes the cardinality of the set $\mathcal{K}$. The same criteria that are also used for optimization of parameters such as a precoding matrix indication (PMI) for channel state information (CSI) feedback may be used to find the codeword that maximizes the RSRP.

The RSSI of the signal after combining may be computed as follows:

$$RSSI = \frac{1}{|\mathcal{K}|} \sum_{k \in \mathcal{K}} \left| [\tilde{c}_1 \cdots \tilde{c}_{N_R}] \begin{bmatrix} \hat{h}_1(k) \\ \vdots \\ \hat{h}_{N_R}(k) \end{bmatrix} \right|^2, \quad \text{Equation (6)}$$

A wideband SNR of the combined signal may be computed as follows:

$$SNR = \frac{RSRP}{RSSI - RSRP}. \quad \text{Equation (7)}$$

Similarly, an SNR value per RE may be computed by Equations (5)-(7) per RE without averaging over k. This SNR value per RE may be used to derive a mutual information (MI) metric using SNR-based MI mapping like Mean Mutual Information per coded Bit (MMIB) or Mutual Information Effective SNR Mapping (MIESM). This may allow MI-domain beam optimization, whereby a beam that most likely maximizes a data throughput may be selected.

Assuming time synchronization and a frequency flat channel, the channel response estimate may be obtained as follows:

$$\begin{bmatrix} \check{h}_1 \\ \vdots \\ \check{h}_{N_R} \end{bmatrix} = \frac{1}{|\mathcal{K}|} \sum_{k \in \mathcal{K}} \begin{bmatrix} \hat{h}_1(k) \\ \vdots \\ \hat{h}_{N_R}(k) \end{bmatrix}. \quad \text{Equation (8)}$$

In some examples, the optimum codeword may be computed from the estimated channel response as follows:

$$[\tilde{c}_1 \cdots \tilde{c}_{N_R}] = \begin{bmatrix} \check{h}_1/|\check{h}_1| \\ \vdots \\ \check{h}_{N_R}/|\check{h}_{N_R}| \end{bmatrix}^H, \quad \text{Equation (9)}$$

where $(\bullet)^H$ corresponds to Hermitian transposition. In the above example, the optimum codeword may correspond to the negative angle (phase revert of the channel response) of the individual antennas/antenna elements. A mapping to the quantized phase shift values may be applied subsequently. For non-flat fading channels advanced codeword optimization strategies may be employed. For instance, a predetermined metric (e.g. RSRP, RSSI, SNR, MI) may be computed for each of multiple distinct subsets of the set $\mathcal{K}$. Based on the set of such metrics, a set of codewords may be determined, whereby one codeword is associated with one subset of $\mathcal{K}$ and is optimum for that subset. An exampleway to construct such subsets is to divide the full frequency band into more than one non-overlapping and contiguous subbands, as is the case in 3GPP LTE and NR systems.

Alternatively, a codebook for the antenna may be predefined and all or some entries of the codebook may be tested as candidate codewords. Due to control and hardware limitations the codebook $\tilde{c}_n$ may include a limited number of phase shifts. This codebook search may be employed without additional measurements based on the channel knowledge obtained by the channel estimation procedure. Therefore, this optimization would be limited by the digital processing latency, not by RF switching latency or the network scheduling of the reference signals.

In some examples, the conventional codebook-based beamforming method may be combined with the example methods disclosed herein and may operate in parallel. The optimal codeword may be jointly determined by the conventional scheme and the example methods. A conventional codebook-based beamforming method may be performed in parallel such that a power or any other metrics may be measured while sweeping through beams using a codebook. An optimal codeword may then be selected through both methods in parallel.

As mentioned before, the training codeword matrix C needs to be invertible. In one example, an identity matrix may be used as a training codeword matrix and each training codeword may be a unit sequence of the identity matrix. With the identity matrix, for each measurement only one antenna element is active at a time and the inversion can be avoided in Equation (4). One drawback of using the identity matrix is that enabling and disabling of receive antennas might need more time to stabilize than a modification of the phase. This could be an issue when consecutive OFDM symbols are used to measure different RX beam forming configurations. Another drawback is that a distinct set of enabled receive antennas may lead to distinct beam characteristics, such that a contribution of one antenna to a beam pattern via multiple antennas may not be deduced from its characteristics when only one antenna is enabled.

In another example, in order to avoid enabling and disabling of antenna, a Hadamard matrix may be used as a training codeword matrix such that each training codeword may be a Hadamard sequence in the Hadamard matrix. A Hadamard matrix is a square matrix whose entries are either +1 or −1 and whose rows are mutually orthogonal. By using a Hadamard matrix as a training codeword matrix the phase needs to be rotated by 180° for certain antennas. Since a Hadamard matrix is an orthogonal matrix, the inverse can be computed by the transpose of the matrix.

In another example, a training codebook may be predefined and entries from the predefined codebook may be used for training. The training codeword matrix may include a plurality of (e.g. $N_R$) codewords that are orthogonal to each other. Since this codebook can be defined in advance (e.g. at the design stage), it is possible to predefine the codebook and pre-compute the inverse of the training codeword matrix.

In still another example, the disclosed example schemes may be combined with a codebook-based measurement optimization. For a codebook-based measurement optimization, a codebook is prepared and used for training, where each entry of the codebook includes a codeword $[c_1 \ldots c_{N_R}]$, where the individual entries cover different spatial directions. By combining $N_R$ orthogonal measurements from this codebook, the channel may be estimated according to Equation (2). In this context, "orthogonal" means that the training codeword matrix C is invertible.

The application of the disclosed examples in the context of 3GPP NR mmWave transmission will be explained hereafter. In 3GPP NR, a UE may use reference signals, such as SSBs and CSI-RSs, for UE RX beam optimization.

The base station (e.g. gNB) and the UE implement a beam management process for setting up an optimum beam for transmission and reception. In the initial acquisition phase (P1), based on SSBs the gNB TX beam and the UE RX beam may be selected. A CSI-RS may not be used in this phase. Once a transmit beam and receive beam are selected, the next two phases will apply.

In the TX beam refinement phase (P2) the best gNB TX beam may be optimized. In this phase SSBs and CSI-RS may be transmitted by the gNB. Since CSI-RS repetition may be disabled in this phase, the UE may not be able measure with different RX beam hypotheses. The UE may employ the current active RX beam that is also used to receive the control and data channels.

In the RX beam refinement phase (P3) the best UE RX beam may be selected. In this phase SSBs and CSI-RS can be transmitted by the gNB. Since CSI-RS repetition may be enabled in this phase, the UE may be able to measure with different RX beam hypotheses for a constant TX beam. The length of the CSI-RS repetition may be decided by the network and signaled to the UE. In this phase optimization of the RX beam based on reference signals such as CSI-RS or SSB may be performed in accordance with the examples disclosed herein.

In phases P2 and P3 above, the network decides if the gNB TX beams are based on SSBs, CSI-RS, or both SSBs and CSI-RSs. Therefore, the example methods disclosed herein may operate on SSB-based measurements as well as CSI-RS-based measurements.

Figure 2:
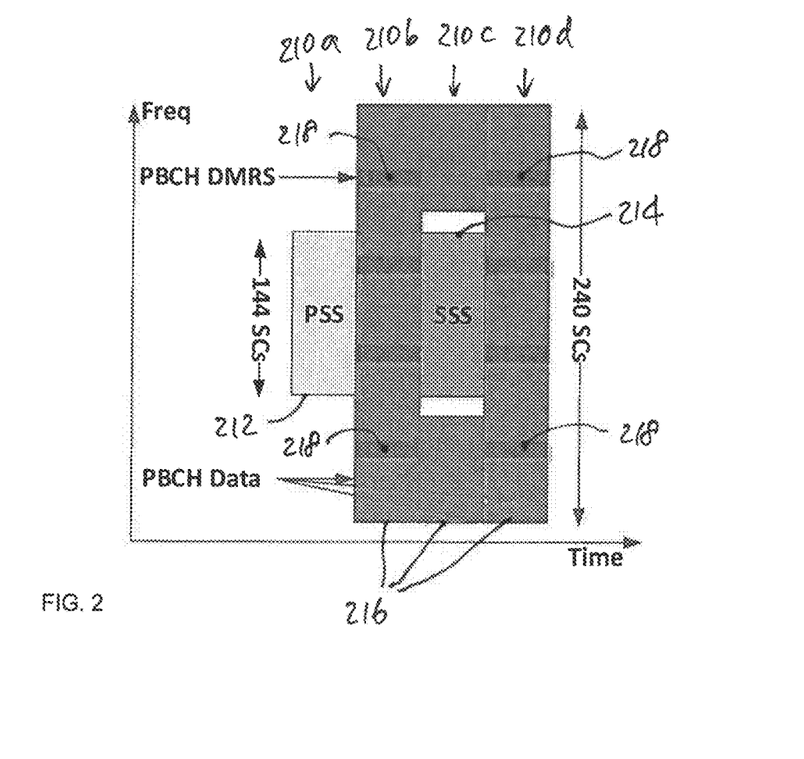
FIG. 2 shows a structure of a synchronization signal block in 3GPP NR.

FIG. 2 shows a structure of a synchronization signal block in 3GPP NR. The SSB includes four (4) OFDM symbols 210a-210d. The PSS 212 is allocated in the center 127 REs (sub-carriers) of the total 240 REs in the first OFDM symbol 210a of the SSB. In the second and fourth OFDM symbols 210b, 210d, the PBCH 216 is allocated in all 240 REs. In the third OFDM symbol 210c, the center 127 REs are occupied by the SSS 214, and 96 REs, split into two blocks with 48 REs each, are allocated to the PBCH 216. The sequences of the PSS and SSS are already known to the UE during the third phase (P3) of the beam management and can be used as reference signals for channel measurements. Furthermore, the PBCH 216 contains demodulation reference signals (DMRS) 218 on every fourth RE. With the SSBs, the measurements may be performed on the second to fourth OFDM symbols 210b-210d, using the locations of the PBCH DMRS 218 in the second and fourth OFDM symbols 210b, 210d. In the third OFDM symbol 210c, the SSS 214 may be used as reference symbols and a frequency domain interpolation may be performed in the gap between the SSS 214 and the PBCH 216. For example, during the transmission of one SSB, measurements may be performed three (3) (or more depending on UE capability) different RX beam configurations (e.g. one measurement on each OFDM symbol with a different RX beam configuration).

The SSB for the same transmit beam, i.e. the same SSB index, may be repeated with a network configurable periodicity. For example, the periodicities of the SSB may be P={5, 10, 20, 40, 80, 160} msec. Therefore, after $$T_{SSB} = \text{ceil}\left(\frac{N_R}{3}\right) \cdot P,$$

enough measurements may be obtained to compute the channel response and the optimum phase adjustment coefficients (i.e. the beamforming codeword).

Figure 3:
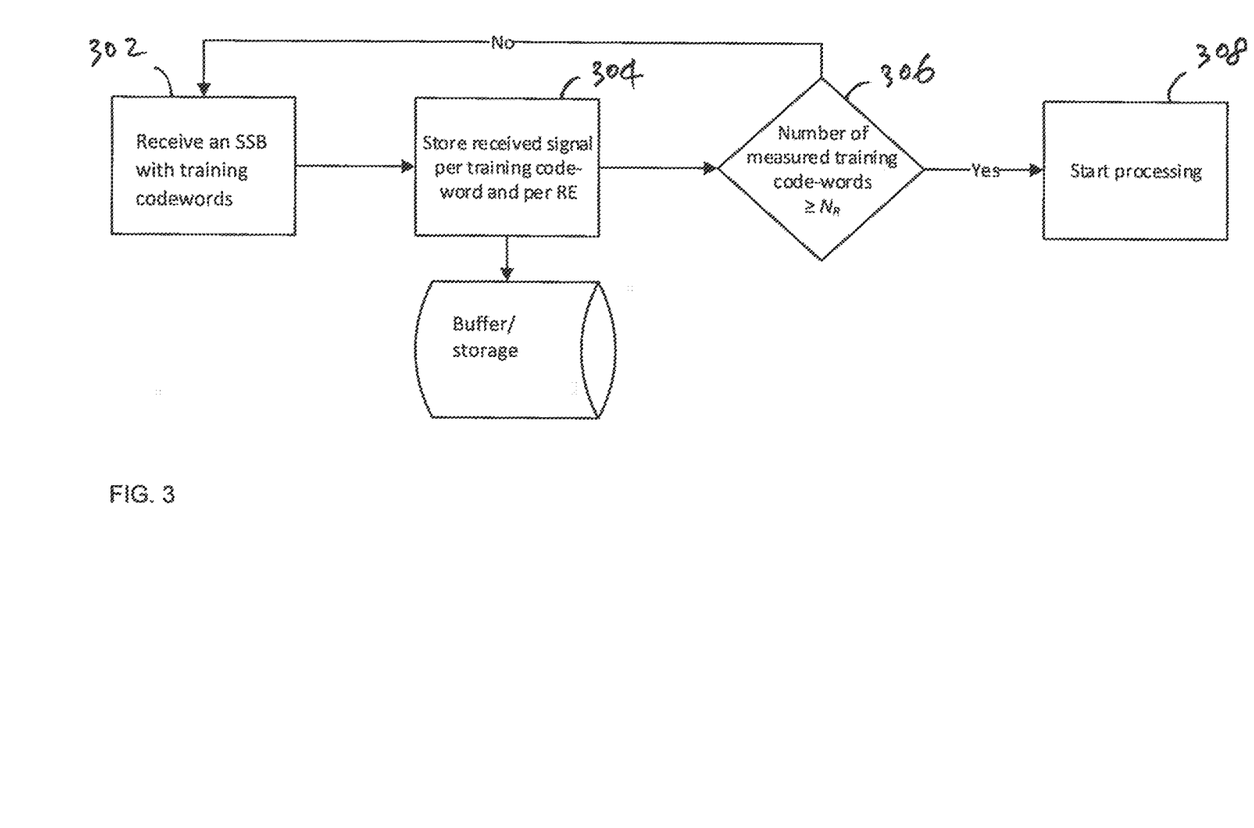
FIG. 3 shows an example flow for a measurement process for channel estimation based on SSBs for one SSB index.

FIG. 3 shows an example flow for a measurement process for channel estimation based on SSBs for one SSB index. A UE receives an SSB with training codewords (302). When an SSB with a specific SSB index is transmitted, during OFDM symbols 2 to 4 of the SSB, three (or more depending on the UE capability) training codewords (i.e. different RX beams) may be measured. If the UE has a capability to apply multiple RX beams per OFDM symbol, several training codewords may be measured in one OFDM symbol. The received signal per training codeword (i.e. the RX beam) and per RE may then be stored in a buffer/storage (e.g. in a database) (304). It is determined whether the number of measured training codewords is greater than or equal to the number of receive antennas $N_R$ in the UE (306). If so, the processing of the received signals for channel estimation and RX beamforming codeword selection may start (308). If not, the process returns to step 302 and the measurement continues in the next instance of the SSB transmission of the same SSB index.

Figure 4:
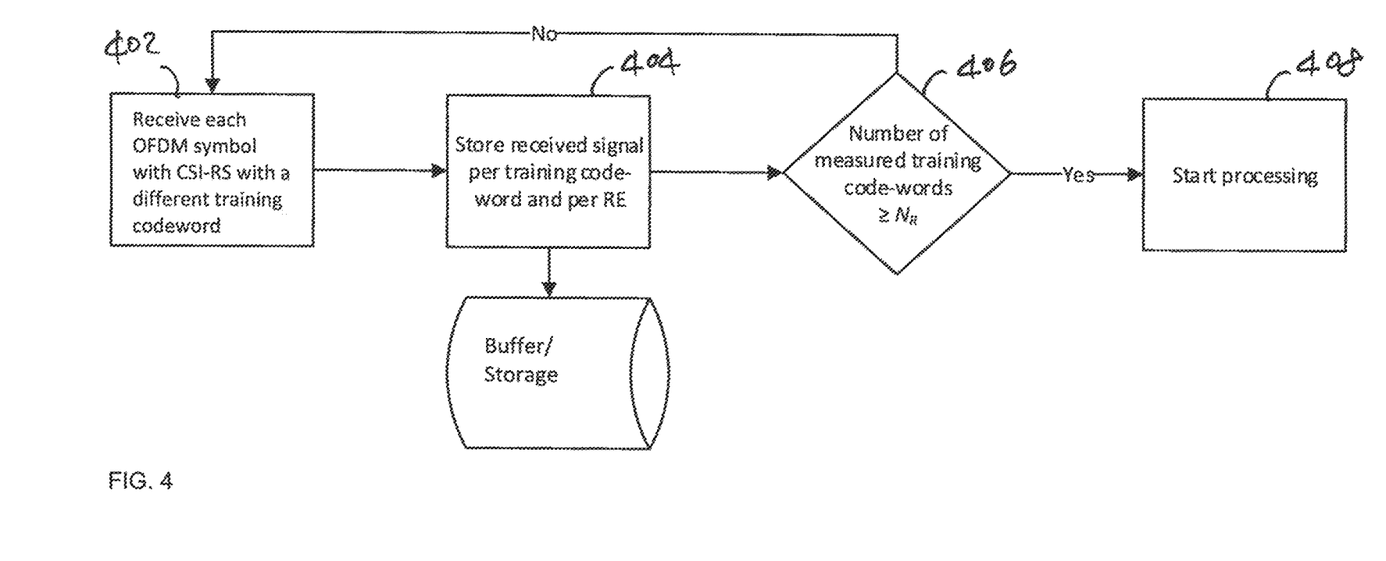
FIG. 4 shows an example flow for a measurement process for channel estimation based on a CSI-RS.

FIG. 4 shows an example flow for a measurement process for channel estimation based on a CSI-RS. The channel estimation may be performed based on the transmission of a CSI-RS with repetition. During the transmission of CSI-RS with enabled repetition, a UE receives each OFDM symbol with a CSI-RS with a different training codeword (402). One training codeword may be measured in each OFDM symbol with CSI-RS. Alternatively, if it is supported by the UE to apply multiple RX beams per OFDM symbol, then the number of training codewords (i.e. the number of RX beam measurements) may be scaled with the number of RX beams that can be applied per symbol. The received signal per RX beam and per RE may be stored in a buffer/storage (e.g. in a database) (404). It is determined whether the number of measured training codewords is greater than or equal to the number of receive antenna elements $N_R$ (406). If so, the processing of the received signals for channel estimation and RX beamforming codeword selection may start. If not, the process returns to step 402 and the measurement continues in the next instance where the same CSI-RS resource is transmitted with repetition enabled.

Figure 5:
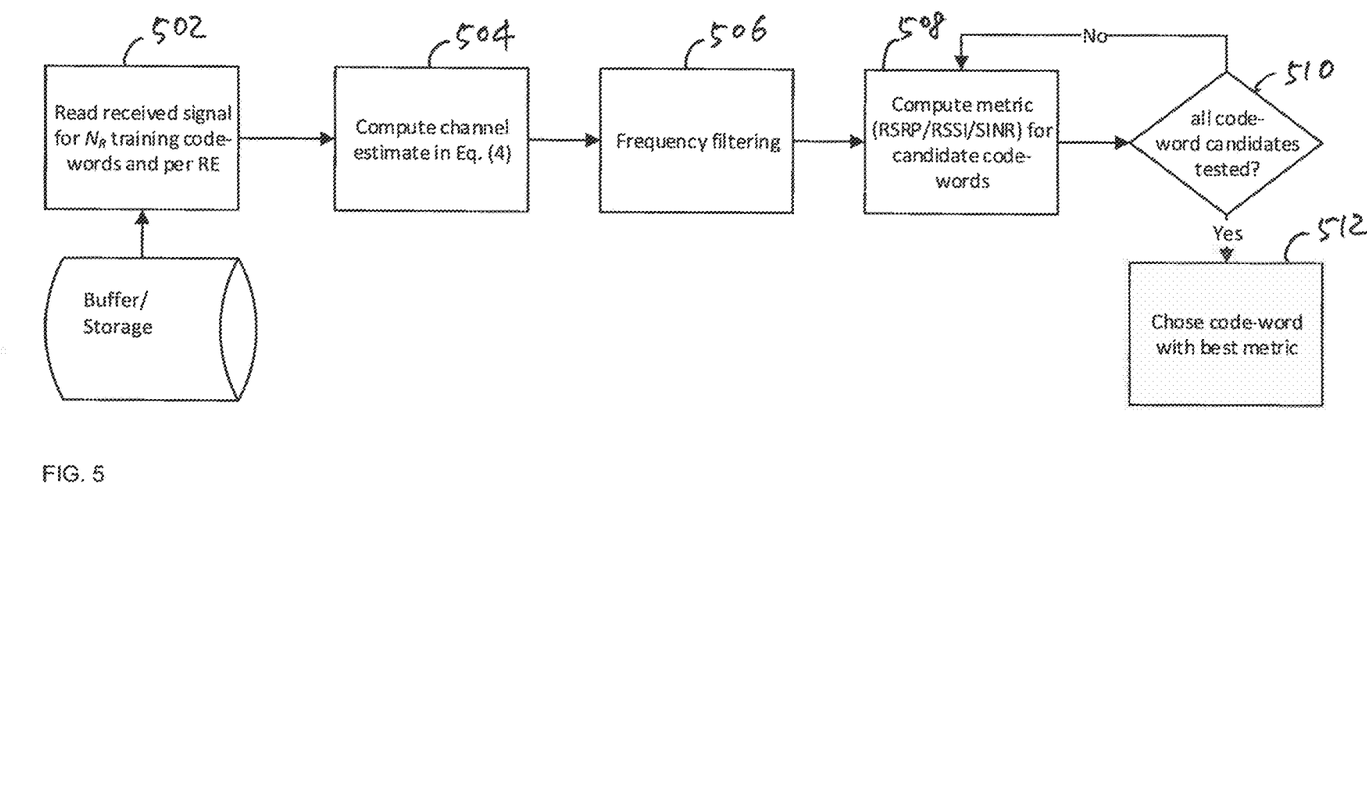
FIG. 5 shows an example flow for processing the received signals to compute channel estimates and determine a codeword for receive beamforming.

FIG. 5 shows an example flow for processing the received signals to compute channel estimates and determine a codeword for receive beamforming. The received signals for $N_R$ RX codewords and per RE may be read from the buffer/storage (502). The received signals may be processed to compute the channel estimate in accordance with Equation (4) (504). Frequency filtering may be applied to reduce noise (506). A predetermined metric (e.g. RSRP, RSSI, SINR, MI, etc.) may be computed for candidate codewords based on the knowledge of the channel estimates and taking into account the limitations of the analog beamformer in the UE (e.g. quantized phase shifter) (508). It may be determined whether all candidate codewords are tested (510). If so, the codeword with the best metric may be selected (512). The maximization of the metric may be achieved by a candidate codeword search or by a direct computation of the best codeword if a metric is available to optimize the codeword directly. Alternatively, the optimum codeword may be directly computed from the estimated channel response as explained above.

For the coherent RX beamforming, deriving an accurate channel estimate for each antenna/antenna element during the training phase is a key to improve the RX analog beamforming performance. Comparing with the CSI-RS-based method, the SSB-based method has some shortcomings.

In an SSB, less consecutive training OFDM symbols are provided compared to the CSI-RS for coherent channel measurements. As mentioned above with respect to FIG. 2, 3 OFDM symbols may be used per SSB while a PSS is excluded. This is because there are very limited NR PSS sequences (3 PSS sequences) in the system. When there is another PSS with the same sequence from a neighboring gNB colliding with the PSS from the serving gNB, the two TX beams may not be separated in the UE, which confuses the RX beamforming algorithm and degrades the beamforming performance. In addition, the SSB is a narrow band signal which can have less reference sub-carriers than CSI-RS.

In order to overcome the above drawbacks and further improve the SSB-based coherent RX beamforming performance, the following example methods may be implemented.

In one example, a PSS symbol may be dynamically selected as a training symbol based on colliding PSS detection, so that the training time can be shortened. The colliding PSS detection may be achieved by running additional SSS blind detection processing on the received serving gNB SSS symbol location in the same SSB. An NR PSS is determined by a sector ID (3 hypothesis) but an NR SSS is determined by both a sector ID (3 hypothesis) and a group ID (336 hypothesis). Therefore, running an SSS blind detection over full hypothesis (3×336) will detect all colliding neighboring TX beams including the ones with the same PSS sequence. Only time synchronized neighboring cells whose PSS is colliding with that of the serving cell need to be detected. The detection is based on the received SSS in the same SSB. Furthermore, the SSS blind detection may be achieved by fast Hadamard transformation (FHT) and is very fast even when the number of hypothesis is huge.

Based on the detection results, the received PSS symbol may be selected as a training symbol to speed up the training. This may lead to 25% training time reduction comparing with the SSB-based method without using the PSS symbol.

Alternatively, the training codeword switching in the RF part of the UE may include a PSS symbol, but based on the detection results, the baseband processing may dynamically exclude or include the PSS symbol into the RX coherent beamforming algorithm. Furthermore, the RSRP measurement or the like may be done on the detected neighboring cell which has the same PSS sequence, and compared with that from the serving cell in the same SSB. When the colliding neighboring cell is weak enough, the PSS symbol may be included for the coherent RX beamforming.

Figure 6:
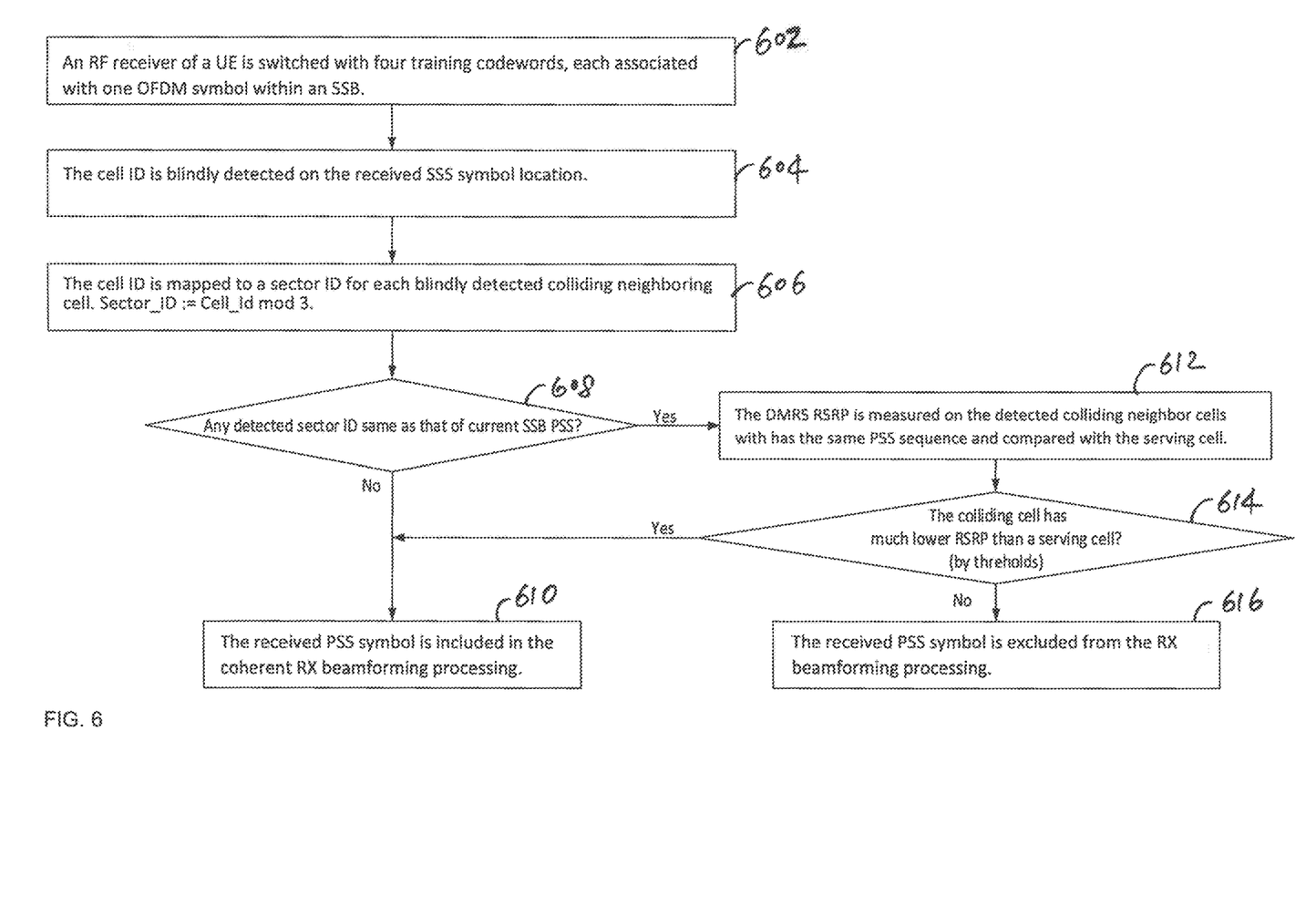
FIG. 6 is a flow diagram of an example process of selecting a primary synchronization signal (PSS) symbol as an RX beamforming training symbol based on colliding PSS detection and/or reference signal received power (RSRP) comparison in the same SSB.

FIG. 6 is a flow diagram of an example process of selecting a PSS symbol as an RX beamforming training symbol based on colliding PSS detection and/or RSRP comparison in the same SSB. An RF receiver of a UE is switched with four (4) (or more depending on UE capability) training codewords, each associated with one OFDM symbol within an SSB (602). Therefore, all four OFDM symbols of the SSB may be received and measured. The cell ID is blindly detected on the received SSS symbol location (604). Ghost cell filtering processing may be implemented to remove false alarmed neighboring cell IDs. The cell ID is mapped to a sector ID for each blindly detected colliding neighboring cell (606). For example, the sector ID may be determined as follows: Sector_ID:=Cell_Id mod 3. It is determined whether any detected sector ID is same as that of the current SSB PSS (608). Only time synchronized neighboring cells whose PSS is colliding with that of the serving cell need to be detected. The detection is based on received SSS in the same SSB. If not, the received PSS symbol is included in the coherent RX beamforming processing (610). If so, the DMRS RSRP (or any quality metric) may be measured on the detected colliding neighboring cells which have the same PSS sequence and the measured DMRS RSRP is compared with that of the serving cell (612). It is determined whether the colliding cell has much lower RSRP than the serving cell, e.g. by a threshold (614). The threshold may be a relative power difference comparing with the serving cell SSB. If so, the received PSS symbol is included in the coherent RX beamforming processing (610). If not, the received PSS symbol is excluded from the coherent RX beamforming processing (616).

In another example, the PBCH data subcarriers may be used in channel measurement based on priori master information block (MIB) information or PBCH decoding (e.g. run-time cyclic redundancy check (CRC) check on PBCH). With this scheme, more REs may be explored to improve the coherent RX beamforming accuracy.

In 3GPP NR, RX beamforming is needed in a radio resource control (RRC) connected mode. In the RRC connected mode, serving cell PBCH decoding may not be required and serving cell SSBs may be used for RX beam sweeping or RX beamforming. In order to improve the channel measurement accuracy, the PBCH data subcarriers may also be used opportunistically, for example when the MIB bits are pre-known or the MIB bits can be decoded (e.g. CRC passes) from the PBCH when the PBCH symbols are RX beam swept. Considering that a PBCH is allocated in 3 OFDM symbols in an SSB, due to RX beam switching in each OFDM symbol, time interpolation of a PBCH DMRS may not be performed. Therefore, the PBCH decoding in this case would have worse performance than in a normal case. Considering that the PBCH has very redundant design with a small MCS, there is still a quite high probability that the PBCH can be successfully decoded. When the PBCH is successfully decoded (e.g. the CRC on PBCH passes), re-encoding and re-modulation of the decoded PBCH in-phase and Quadrature (I/Q) data may provide the channel observation on the PBCH data subcarriers. This can help improving the coherent RX beamforming performance. Furthermore, when MIB bits are pre-known either by higher layer signaling or by history information or by other non-PBCH-based detection methods, then the PBCH decoding may not be needed and a direct re-encoding and re-modulation of PBCH by pre-known MIB bits may provide channel observations on the PBCH data subcarriers.

Figure 7:
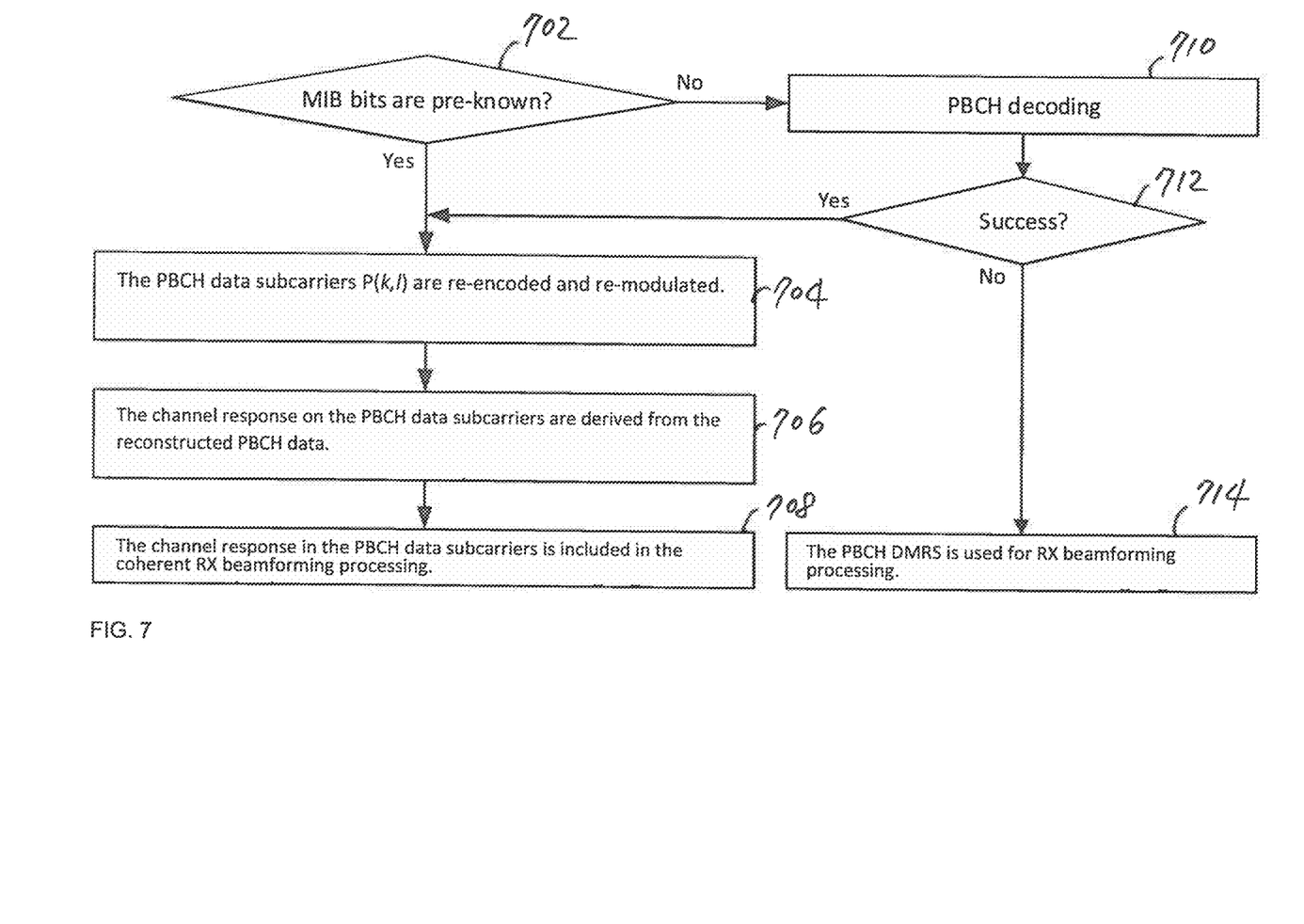
FIG. 7 is a flow diagram of an example process of using physical broadcast channel (PBCH) data sub-carriers for coherent channel measurement for the RX beam forming.

FIG. 7 is a flow diagram of an example process of using PBCH data sub-carriers for coherent channel measurement for the RX beam forming. It is determined whether MIB bits are pre-known (702). If the MIB bits are pre-known, the PBCH data subcarriers P(k,l) are re-encoded and re-modulated (704). P(k,l) is the reconstructed subcarrier k in SSB OFDM symbol l. The channel response on the PBCH data subcarriers are derived from the reconstructed PBCH data (706). The channel response H(k,l)=Y(k,l)/P(k,l), where Y(k,l) is the received PBCH data subcarrier k in the SSB OFDM symbol l. The channel response in the PBCH data subcarriers may be included in the coherent RX beamforming processing (708).

If the MIB bits are not pre-known, the PBCH decoding may be performed (710). If it is determined that the PBCH decoding is successful (712), the process goes to step 704 to reconstruct the PBCH data subcarriers of the SSB symbol. If it is determined that the PBCH decoding is not successful (712), the PBCH data subcarriers are excluded but the PBCH DMRS may be used for RX beamforming processing (714).

In some examples, in order to improve the measurement accuracy and to exploit the fact that sometimes (influenced by the NR reference signal periodicity) more than $N_R$ training codewords may be measured, the channel estimation described herein may be extended. During each measurement cycle additional training codewords may be applied and the result may be stored in the received signal buffer. Then, instead of using the inverse of a square training codeword matrix C, a matrix with more rows than columns, i.e. more RX beams, may be used. In this case the inverse operation may be replaced by the Moore-Penrose inverse. The subsequent operations may be unchanged.

To exploit multiple measurements over time and also consider the aging of the measurement, the disclosed methods may be extended with e.g. a recursive least square or Kalman filter approach. In that case, each additional training codeword may be used to refine the channel measurement without the need to invert the training codeword matrix.

For initial RX beam forming the time to optimize the RX beam is significantly reduced compared to the conventional codebook-based approach. During beam tracking obstacles or moving objects may suddenly block the direct link and a codebook exploiting neighboring beams may not be able to track the beam. The examples disclosed herein avoid being stuck in a local maximum of the optimization and find the overall best beam. The number of RX beams that need to be tested is lower compared to the conventional codebook-based beamforming methods (e.g. equal to the number of receive antennas instead of the number of candidate codewords in the codebook). The examples allow to fully exploit any configurability on RF side to its full potential without being limited by a codebook, thus e.g. allowing higher peak throughput by means of antenna fine-tuning.

Figure 8:
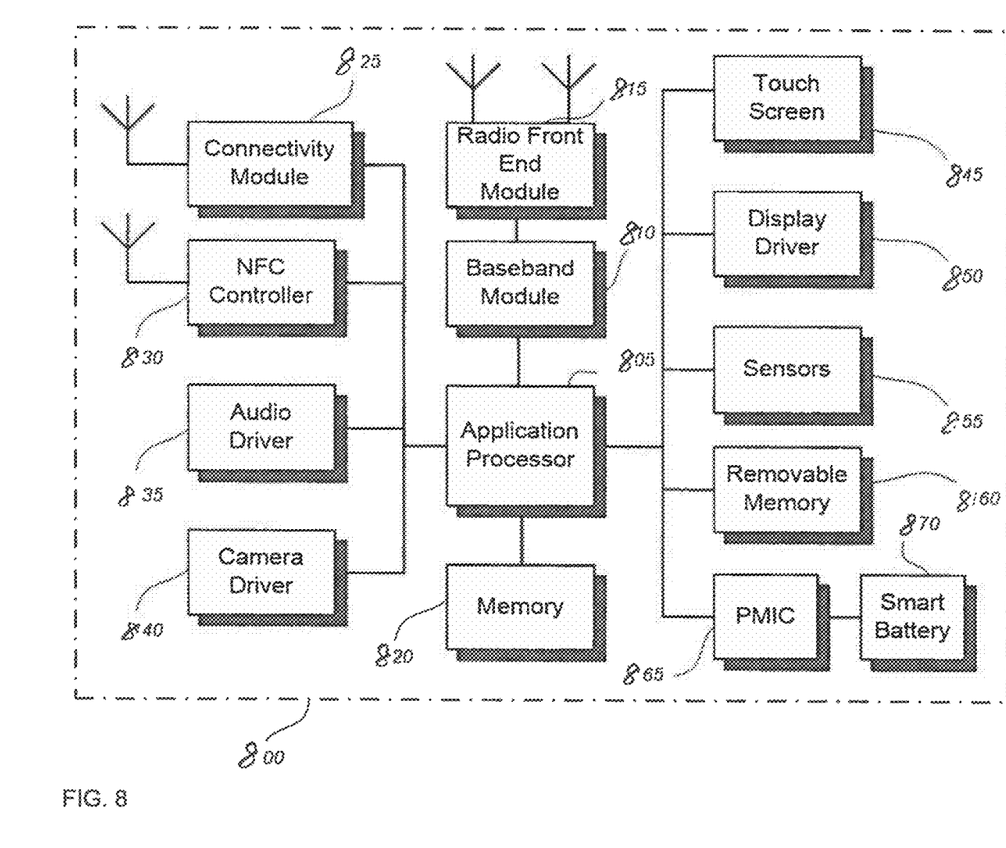
FIG. 8 illustrates a user device in accordance with an aspect.

FIG. 8 illustrates a user device 800 (e.g. a UE) in accordance with an aspect. The user device 800 may be a mobile device in some aspects and includes an application processor 805, baseband processor 810 (also referred to as a baseband module), radio front end module (RFEM) 815, memory 820, connectivity module 825, near field communication (NFC) controller 830, audio driver 835, camera driver 840, touch screen 845, display driver 850, sensors 855, removable memory 860, power management integrated circuit (PMIC) 865 and smart battery 870.

In some aspects, application processor 805 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 810 may be implemented, for example, as a solder-down substrate including one or more integrated circuits, a single packaged integrated circuit soldered to a main circuit board, and/or a multi-chip module containing two or more integrated circuits.

Another example is a computer program having a program code for performing at least one of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

The examples as described herein may be summarized as follows:

Example 1 is a wireless communication device comprising a plurality of antennas configured to receive signals, a plurality of phase shifters, each phase shifter configured to adjust a phase of a signal received on a corresponding antenna, a combiner configured to combine the signals after adjustment of a phase by the phase shifters, an analog-to-digital converter configured to convert the combined signal to a digital signal, a channel estimator configured to estimate a set of channel responses for the plurality of antennas from a set of digital signals obtained by multiple channel observations, and a controller configured to determine a beamforming codeword for receive beamforming based on the set of channel responses and apply the beamforming codeword to a received signal on the plurality of antennas.

Example 2 is the wireless communication device of example 1, wherein the controller is configured to send a training codeword to be applied to the received signals by the phase shifters in analog domain, wherein the training codeword includes phase adjustment coefficients for each antenna and a different training codeword is applied for each channel observation.

Example 3 is the wireless communication device as in any one of examples 1-2, wherein the controller is configured to measure a metric for at least one candidate codeword based on the set of channel responses and determine the beamforming codeword based on the metric.

Example 4 is the wireless communication device as in any one of examples 1-3, wherein the controller is configured to compute the beamforming codeword from the set of channel responses by reverting a channel distortion for each antenna.

Example 5 is the wireless communication device as in any one of examples 1-4, wherein the received signals are a synchronization signal block. The synchronization signal block may include a primary synchronization signal, a secondary synchronization signal, and a physical broadcast channel. The controller is configured to determine whether a primary synchronization signal from any neighboring cells is detected, and determine whether any detected primary synchronization signal from the neighboring cells has storing signal power over a predetermined threshold, and use the primary synchronization signal in the channel estimation if no primary synchronization signal is detected from the neighboring cells or the detected primary synchronization signal from the neighboring cells has a signal power below the predetermined threshold.

Example 6 is the wireless communication device as in any one of examples 1-5, wherein the received signals a synchronization signal block. The synchronization signal block includes a primary synchronization signal, a secondary synchronization signal, and a physical broadcast channel. The controller is configured to reconstruct physical broadcast channel data subcarriers and use the reconstructed physical broadcast channel data subcarriers in the channel estimation.

Example 7 is the wireless communication device as in any one of examples 1-6, wherein the controller is configured to perform a measurement on the combined signal while sweeping through beams according to a pre-configured codebook and determine the beamforming codeword further based on the measurement.

Example 8 is a method for receive beam-forming in an analog domain in a wireless communication device. The method comprises receiving signals via a plurality of antennas, applying a training codeword to the received signals to adjust a phase of the received signals, combining the signals after adjustment of a phase, converting the combined signal to a digital signal, estimating a set of channel responses for the plurality of antennas from a set of digital signals obtained by multiple channel observations, determining a beamforming codeword for receive beamforming based on the set of channel responses, and applying the beamforming codeword to a received signal on the plurality of antennas.

Example 9 is the method of example 8, wherein the training codeword includes phase adjustment coefficients for each antenna and a different training codeword is applied for each channel observation.

Example 10 is the method of example 9, further comprising measuring a metric for at least one candidate codeword based on the set of channel responses, wherein the beamforming codeword is determined among the at least one candidate codeword based on the metric.

Example 11 is the method as in any one of examples 8-10, wherein the beamforming codeword is computed from the set of channel responses by reverting a channel distortion for each antenna.

Example 12 is the method as in any one of examples 8-11, wherein the received signals are a synchronization signal block, wherein the synchronization signal block includes a primary synchronization signal, a secondary synchronization signal, and a physical broadcast channel. The method further comprises determining whether a primary synchronization signal from any neighboring cells is detected and determining whether any detected primary synchronization signal from the neighboring cells has storing signal power over a predetermined threshold. The primary synchronization signal is used in estimating the set of channel responses if no primary synchronization signal is detected from the neighboring cells or the detected primary synchronization signal from the neighboring cells has a signal power below the predetermined threshold.

Example 13 is the method as in any one of examples 8-12, wherein the received signals are a synchronization signal block, wherein the synchronization signal block includes a primary synchronization signal, a secondary synchronization signal, and a physical broadcast channel. The method further comprises reconstructing physical broadcast channel data subcarriers, wherein the set of channel responses are estimated from the reconstructed physical broadcast channel data subcarriers.

Example 14 is the method as in any one of examples 8-13, wherein the method further comprises performing a measurement on the combined signal while sweeping through beams according to a pre-configured codebook, wherein the beamforming codeword is determined further based on the measurement.

Example 15 is a machine-readable storage medium including machine readable instructions, when executed, to implement a method or realize an apparatus as in any one of preceding examples.

Example 16 is a wireless communication device comprising a plurality of antennas configured to receive signals, a plurality of phase shifting means, each phase shifting means is configured to adjust a phase of a signal received on a corresponding antenna, a means for combining the signals after adjustment of a phase by the phase shifting means, a means for converting the combined signal to a digital signal, a means for estimating a set of channel responses for the plurality of antennas from a set of digital signals obtained by multiple channel observations, and a means for determining a beamforming codeword for receive beamforming based on the set of channel responses and applying the beamforming codeword to a received signal on the plurality of antennas.

Example 17 is the wireless communication device of example 16, wherein the controlling means is configured to send a training codeword to be applied to the received signals by the phase shifting means in analog domain, wherein the training codeword includes phase adjustment coefficients for each antenna and a different training codeword is applied for each channel observation.

Example 18 is the wireless communication device as in any one of examples 16-17, wherein the controlling means is configured to measure a metric for at least one candidate codeword based on the set of channel responses and determine the beamforming codeword based on the metric.

Example 19 is the wireless communication device as in any one of examples 16-18, wherein the controlling means is configured to compute the beamforming codeword from the set of channel responses by reverting a channel distortion for each antenna.

Example 20 is the wireless communication device as in any one of examples 16-19, wherein the received signals are a synchronization signal block. The synchronization signal block may include a primary synchronization signal, a secondary synchronization signal, and a physical broadcast channel. The controlling means is configured to determine whether a primary synchronization signal from any neighboring cells is detected, and determine whether any detected primary synchronization signal from the neighboring cells has storing signal power over a predetermined threshold, and use the primary synchronization signal in the channel estimation if no primary synchronization signal is detected from the neighboring cells or the detected primary synchronization signal from the neighboring cells has a signal power below the predetermined threshold.

Example 21 is the wireless communication device as in any one of examples 16-20, wherein the received signals a synchronization signal block. The synchronization signal block includes a primary synchronization signal, a secondary synchronization signal, and a physical broadcast channel. The controlling means is configured to reconstruct physical broadcast channel data subcarriers and use the reconstructed physical broadcast channel data subcarriers in the channel estimation.

Example 22 is the wireless communication device as in any one of examples 16-21, wherein the controlling means is configured to perform a measurement on the combined signal while sweeping through beams according to a pre-configured codebook and determine the beamforming codeword further based on the measurement.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A wireless communication device comprising:
a plurality of antennas configured to receive signals;
a plurality of phase shifters, each phase shifter configured to adjust a phase of a signal received on a corresponding antenna;
a combiner configured to combine the signals after adjustment of a phase by the phase shifters;
an analog-to-digital converter configured to convert the combined signal to a digital signal;
a channel estimator configured to estimate a set of channel responses including complex channel coefficients for the plurality of antennas from a set of digital signals obtained by multiple channel observations; and
a controller configured to determine a beamforming codeword for receive beamforming based on the set of channel responses and apply the beamforming codeword to a received signal on the plurality of antennas,
wherein the received signal includes a synchronization signal and the controller is configured to use the synchronization signal in estimating the set of channel responses including the complex channel coefficients on a condition that no colliding synchronization signal is detected from neighbor cells or signal power of a synchronization signal from the neighbor cells is below a threshold.

2. The wireless communication device of claim 1, wherein the controller is configured to send a training codeword to be applied to the received signals by the phase shifters in analog domain, wherein the training codeword includes phase adjustment coefficients for each antenna and a different training codeword is applied for each channel observation.

3. The wireless communication device of claim 2, wherein the controller is configured to select the training codeword from a unity matrix, a Hadamard matrix, or a predefined codeword matrix.

4. The wireless communication device of claim 1, wherein the controller is configured to measure a metric for at least one candidate codeword based on the set of channel responses and determine the beamforming codeword based on the metric.

5. The wireless communication device of claim 4, wherein the metric is at least one of a reference signal received power, a received signal strength indicator, a signal-to-noise ratio, or mutual information.

6. The wireless communication device of claim 1, wherein a number of channel observations is same as a number of the antennas of the wireless communication device.

7. The wireless communication device of claim 1, wherein the controller is configured to compute the beamforming codeword from the set of channel responses by reverting a channel distortion for each antenna.

8. The wireless communication device of claim 1, wherein the received signals are a synchronization signal block, wherein the synchronization signal block includes a primary synchronization signal, a secondary synchronization signal, and a physical broadcast channel,
wherein the controller is configured to determine whether a primary synchronization signal from any neighboring cells is detected based on the secondary synchronization signal, and determine whether any detected primary synchronization signal from the neighboring cells has storing signal power over a predetermined threshold, and use the primary synchronization signal in the channel estimation if no primary synchronization signal is detected from the neighboring cells or the detected primary synchronization signal from the neighboring cells has a signal power below the predetermined threshold.

9. The wireless communication device of claim 1, wherein the received signals are a synchronization signal block, wherein the synchronization signal block includes a primary synchronization signal, a secondary synchronization signal, and a physical broadcast channel,
wherein the controller is configured to reconstruct physical broadcast channel data subcarriers and use the reconstructed physical broadcast channel data subcarriers in the channel estimation.

10. The wireless communication device of claim 1, wherein the controller is configured to perform a measurement on the combined signal while sweeping through beams according to a pre-configured codebook and determine the beamforming codeword further based on the measurement.

11. A method for receive beam-forming in an analog domain in a wireless communication device, comprising:
receiving signals via a plurality of antennas;
applying a training codeword to the received signals to adjust a phase of the received signals;
combining the signals after adjustment of a phase;
converting the combined signal to a digital signal;
estimating a set of channel responses including complex channel coefficients for the plurality of antennas from a set of digital signals obtained by multiple channel observations;
determining a beamforming codeword for receive beamforming based on the set of channel responses; and
applying the beamforming codeword to a received signal on the plurality of antennas,
wherein the received signal includes a synchronization signal and the synchronization signal is used in estimating the set of channel responses including the complex channel coefficients on a condition that no colliding synchronization signal is detected from neighbor cells or signal power of a synchronization signal from the neighbor cells is below a threshold.

12. The method of claim 11, wherein the training codeword includes phase adjustment coefficients for each antenna and a different training codeword is applied for each channel observation.

13. The method of claim 12, wherein the training codeword is selected from a unity matrix, a Hadamard matrix, or a predefined codeword matrix.

14. The method of claim 11, further comprising:
measuring a metric for at least one candidate codeword based on the set of channel responses, wherein the beamforming codeword is determined among the at least one candidate codeword based on the metric.

15. The method of claim 14, wherein the metric is at least one of a reference signal received power, a received signal strength indicator, a signal-to-noise ratio, or mutual information.

16. The method of claim 11, wherein the beamforming codeword is computed from the set of channel responses by reverting a channel distortion for each antenna.

17. The method of claim 11, wherein the received signals are a synchronization signal block, wherein the synchronization signal block includes a primary synchronization signal, a secondary synchronization signal, and a physical broadcast channel,
wherein the method further comprising:
determining whether a primary synchronization signal from any neighboring cells is detected based on the secondary synchronization signal; and
determining whether any detected primary synchronization signal from the neighboring cells has storing signal power over a predetermined threshold;
wherein the primary synchronization signal is used in estimating the set of channel responses if no primary synchronization signal is detected from the neighboring cells or the detected primary synchronization signal from the neighboring cells has a signal power below the predetermined threshold.

18. The method of claim 11, wherein the received signals are a synchronization signal block, wherein the synchronization signal block includes a primary synchronization signal, a secondary synchronization signal, and a physical broadcast channel,
wherein the method further comprising:
reconstructing physical broadcast channel data subcarriers, wherein the set of channel responses are estimated from the reconstructed physical broadcast channel data subcarriers.

19. The method of claim 11, wherein the method further comprising:
performing a measurement on the combined signal while sweeping through beams according to a pre-configured codebook, wherein the beamforming codeword is determined further based on the measurement.

20. A non-transitory machine-readable storage medium including machine readable instructions, when executed, to implement a method of claim 11.

* * * * *